No. 888,623. PATENTED MAY 26, 1908.
R. C. LAMBIE.
CHURN AND FREEZER.
APPLICATION FILED FEB. 17, 1908.
2 SHEETS—SHEET 2.
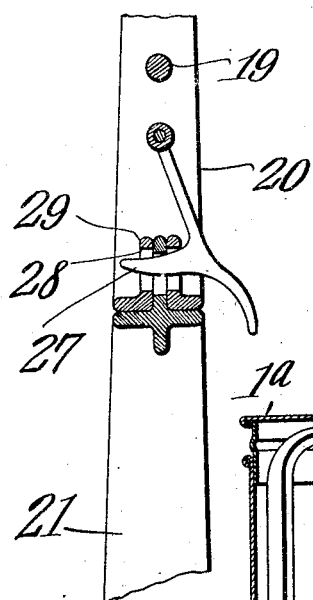
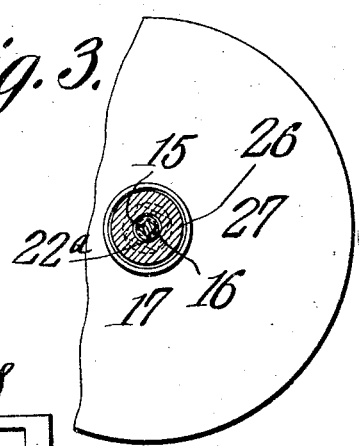
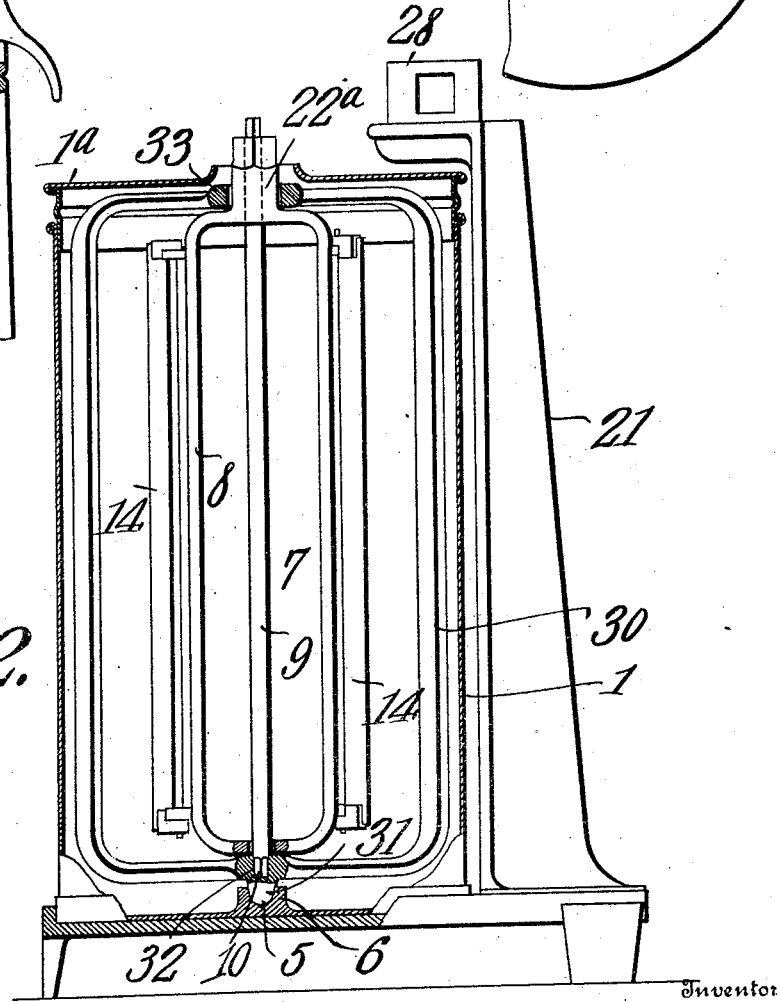
Witnesses
Inventor
Robert C. Lambie.
By C. A. Snow & Co
Attorneys

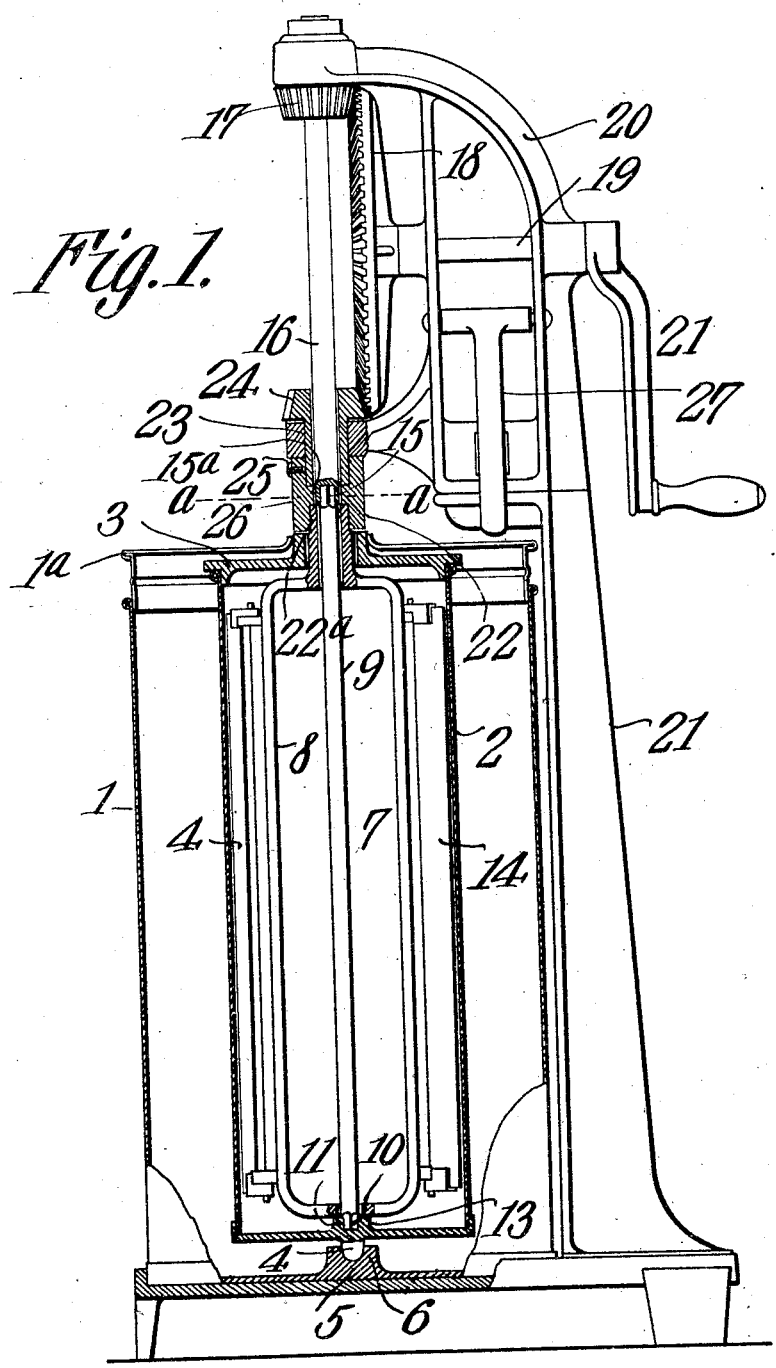

UNITED STATES PATENT OFFICE.

ROBERT COMMON LAMBIE, OF AUSTIN, TEXAS.

CHURN AND FREEZER.

No 888,623.  Specification of Letters Patent.  Patented May 26, 1908.

Application filed February 17, 1908. Serial No. 416,362.

*To all whom it may concern:*

Be it known that I, ROBERT COMMON LAMBIE, a citizen of the United States, residing at Austin, in the county of Travis and State of Texas, have invented a new and useful Churn and Freezer, of which the following is a specification.

My invention relates to an apparatus which with slight change may be used either as an ice cream freezer or as a churn; and has for its object to provide an apparatus of this type which shall be simple, economical and expeditious in its operation of making both ice cream and butter.

With this and other objects in view the invention consists of the novel combination, construction and arrangement of parts hereinafter described and claimed.

In the accompanying drawings, illustrating the preferred embodiment of my invention; Figure 1 shows a side elevation, partly in section thereof arranged as an ice cream freezer. Fig. 2 is a like view with the upper portion of the machine omitted, disclosing the same adapted as a churn. Fig. 3 is a section taken on the line a—a of Fig. 1. Fig. 4 is a broken detail section disclosing a clamping device for the retention of the sections of the two part supporting frame in position.

Similar numerals of reference are employed to indicate corresponding parts throughout the several figures of the drawings.

In carrying out my invention I employ an outer receptacle 1, supported in position upon a suitable base, or directly upon the floor, said receptacle having a suitable cover 1ª.

As shown in Fig. 1, wherein the device is arranged as an ice cream freezer, 2 represents a can having a suitable cover 3, which can has upon the under side of its bottom a round pivot extension 4 bearing in a socket 5 formed in an upstanding central boss or projection 6 secured to or formed with the bottom of the receptacle 1. Said can has arranged therein a dasher 7 comprising a preferably rectangular upright frame 8, through which passes a shaft 9 having its lower end provided with an angular terminal 10 bearing in a socket or step 11 formed in an upstanding central elevation or boss 13, said socket being of corresponding outline with said angular terminal to provide for the rotation of said can by the action of the shaft 9 as presently seen. Said dasher frame 8 is equipped with lateral pivoted wings 14 adapted to move in close contact with the inner surface of the can 2, as also hereinafter made apparent, for engaging the contents of said can, as in the conversion of said contents into ice cream. Said shaft 9 has at a point above a sleeved extension of the frame 8, an angular terminal 15, said terminal engaging a corresponding socket 15ª in the lower end of an additional shaft 16 having at its upper end a miter gear or pinion 17 engaged by a vertical corresponding gear wheel 18, whose shaft 19 bears in the upper section 20 of the supporting frame, the lower section of said frame being secured to a suitable base or floor, said shaft 19, also, being suitably actuated by a handle 21 by which means the motion is manually imparted to the freezer can.

A sleeve 22 having a bore of angular outline is slipped upon the upper corresponding end or terminal of the sleeve 22ª of the dasher frame 8 and also upon a sleeve extension 23 of a miter gear or pinion 24 through which loosely passes the shaft 16, said miter gear or pinion intermeshing with the drive gear wheel 18, and whereby, it will be noted, that motion is transmitted to said dasher frame. Said sleeve 22 is provided with a set screw 25 for the attachment of said sleeve to the sleeve extension 23 of the pinion 24, whereby said sleeve may be readily removed from said pinion sleeve. Said sleeve 23 has an inner angular portion 26 which is interposed between the lower end of the sleeve extension 23' and the upper end of the sleeve extension 22ª of the dasher frame 8, the purpose of which is apparent. Suitably pivoted in the upper frame section 20 is a dog 27 which engages interfitting apertured extensions 28 and 29 projecting from said frame sections, respectively, and whereby said frame sections are adapted to be wedged together firmly in place, as in assembling the parts of the frame in position for use.

It will be noted that in adapting the machine for a churning operation, the can 2 is removed and in lieu thereof is substituted an additional frame member 30 which has on the lower side of its bottom cross piece a rounded pivot-projection 31 which is adapted to be inserted in the socket 5 of the step 6 of the receptacle in lieu of the can pivot extension 4 as above noted. Said frame has in the upper surface of said lower cross bar an angular socket 32 which receives the corresponding terminal of the shaft 9. The upper cross bar of said frame 30 has an aperture through which passes the sleeve extension 22ª of the inner dasher frame 8. Said dasher frame 30 has an annular aperture 33 in its upper cross bar which passes the corresponding surface of the shaft 9, and whereby, it will be seen, that on actuating the handle shaft 19, said outer dasher frame will be actuated together with the reverse actuation of the inner dasher frame 8, as in performing the churning operation.

It will be noted from the above that I have provided a machine which is adapted, as before observed, for readily performing the operation of an ice cream freezer or churn, and which consists of the minimum number of parts for carrying out said purposes, while it is easily constructed and readily operated, as well as expeditious in action.

It will be understood that latitude is allowed herein for making changes in the various details of the above described parts without departing from the spirit of my invention.

I claim:—

1. An apparatus of the class described, comprising a nonrotatable receptacle with a socket in its bottom, a rotatable member within said receptacle having a pivot pin seated in said socket, a central shaft within said rotatable member arranged to engage the bottom thereof and rotate the member, a second shaft in line with the first named shaft and separately connected thereto, a fixed toothed-wheel and a loose tooth-wheel on said second shaft means for rotating said toothed-wheels in opposite directions, a rotatable agitating member in said rotatable member provided with a sleeve surrounding said first named shaft and forming a bearing for the upper end of said rotatable member, a sleeve on said loose toothed-wheel, and an intermediate sleeve connecting the sleeve on said loose wheel to the sleeve on the agitating member.

2. An apparatus of the class described comprising a two-part separate frame, a non-rotatable receptacle supported by the lower part of said frame, oppositely rotatable members in said receptacle, a vertical shaft carrying a fixed toothed-wheel for rotating one of said members, a loose toothed-wheel rotatable in opposite direction to said shaft mounted thereon and connected to the other rotatable member, a toothed-wheel mounted on a shaft carried by the upper part of said two-part frame and gearing with said fixed and loose wheels on said vertical shaft, interfitting apertured plates on adjacent parts of the separable frame, and a pivoted dog adapted to engage in said aperture and hold the frame parts together.

In testimony that I claim the foregoing as my own, I have hereto affixed my signature in the presence of two witnesses.

ROBERT COMMON LAMBIE.

Witnesses:
Z. T. FULMORE,
C. A. BRYANT.